(12) United States Patent
Hurtz

(10) Patent No.: US 6,366,391 B1
(45) Date of Patent: Apr. 2, 2002

(54) ELECTROCHROME CELL

(75) Inventor: Jörg Hurtz, Kriegsfeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/600,357

(22) PCT Filed: Jan. 9, 1999

(86) PCT No.: PCT/EP99/00094

§ 371 Date: Jul. 14, 2000

§ 102(e) Date: Jul. 14, 2000

(87) PCT Pub. No.: WO99/38049

PCT Pub. Date: Jul. 29, 1999

(30) Foreign Application Priority Data

Jan. 23, 1998 (DE) .......................... 198 02 339

(51) Int. Cl.[7] .............................. G02F 1/153; G02F 1/15
(52) U.S. Cl. ...................................... 359/267; 359/265
(58) Field of Search ................................ 359/265, 267, 359/268, 269, 273, 275

(56) References Cited

U.S. PATENT DOCUMENTS

| 4,056,881 A | 11/1977 | Holt et al. ............... 29/595 R |
| 4,917,477 A | 4/1990 | Bechtel et al. ............. 350/357 |
| 5,066,112 A | 11/1991 | Lynam et al. ............... 359/267 |
| 5,151,824 A | 9/1992 | O'Farrell ..................... 359/604 |
| 5,708,487 A | 1/1998 | Bergman ...................... 349/63 |
| 6,057,956 A * | 5/2000 | Ash et al. .................... 359/267 |
| 6,111,684 A * | 8/2000 | Forgette et al. ............. 359/267 |
| 6,239,898 B1 * | 5/2001 | Byker et al. ................. 359/265 |

FOREIGN PATENT DOCUMENTS

| EP | 0434453 | 6/1991 | ............. B60R/1/08 |

* cited by examiner

Primary Examiner—Ricky Mack
(74) Attorney, Agent, or Firm—Jerrie L. Chiu

(57) ABSTRACT

An electrochromic cell typically comprises two parred, transparent plates (1, 2) with a spacing between them, which are each provided on the side facing the other with an electrically conductive electrode layer (3, 4) which extends over the entire area of the plate and is in each case connected to an external electric connection, which are joined to one another so as to form a seal by means of a bead of adhesive (6) running round the edge region of the plates (1, 2) and in each case leaving a narrow margin (7a, 7b) free, and between which an electrochromic medium (5) is located.

According to the invention, a laminate (8) of metal/solid nonconductor/metal layers is located around the periphery in the space between the two margins (7a, 7b).

This laminate ensures firstly a predetermined spacing of the two plates forming the cell walls and, secondly, serves for making a contact with the planar electrodes (3, 4).

6 Claims, 1 Drawing Sheet

ELECTROCHROME CELL

FIELD OF THE INVENTION

The invention relates to an electrochromic cell comprising two paired, transparent plates with a spacing between them, which are each provided on the side facing the other with an electrically conductive electrode layer which extends over the entire area of the plate and is in each case connected to an external electric connection, which are joined to one another so as to form a seal by means of a bead of adhesive running round the edge region of the plates and in each case leaving a narrow margin free, and between which an electrochromic medium is located.

BACKGROUND

Electrochromic cells, also known as EC cells for short, exploit the reversible change in the colour and/or the optical density in an electrochromic medium, which change is obtained by means of an electrochemical redox reaction which occurs in this electrochromic medium in which the oxidized state and the reduced state have different colours and/or optical densities. Such electrochromic materials alter their optical properties as a result of the action of an electric field; they can be brought back to their initial state by application of a field of opposite polarity.

The EC cells typically comprise two plates which are preferably made of glass, i.e. a front glass and a back glass, which are joined to one another at a spacing and sealed from the surroundings along their periphery. Between the two plates there is the electrochromic, i.e. optically effective, medium, in particular a liquid containing viologens. Each plates is provided on the side facing the EC medium with an electrically conductive electrode layer which covers the entire surface of the plate and is in each case connected to an external electric connection. If a potential is applied to the electric connections of the two planar electrodes, the absorbance of the EC medium located in front of the back glass changes, i.e. the cell loses transparency.

These relationships are prior art and have been disclosed in numerous documents, e.g. U.S. Pat. No. 4,917,477.

Such electrochromic cells are preferably employed in the automobile industry, in particular as automatically dimming interior and exterior mirrors in motor vehicles. In such an application, a mirror layer is located on the back glass of the cell, which is then known as a mirror cell; this mirror layer can also be formed by the associated electrode layer.

Such automatically dimming mirrors increase road safety for night driving by shielding the eyes and help to avoid accidents. For this purpose, the dimmable mirror systems have photoelectric sensors for detecting light which may dazzle the driver; the sensors are installed on the vehicle pointing in the direction from which the light impinges on the mirror. These sensors recognize the danger of dazzling in an instant and dim it to a level more bearable to the eyes by a sliding reduction in the mirror reflection to 10% over a few seconds. When the danger of dazzling has passed, the mirror reflection immediately increases again to the initial value. This automatic darkening and brightening of the EC mirror is repeated every time there is a risk of dazzling throughout the entire life of the vehicle without any reduction in effectiveness.

EC cells can also be employed as screens against the sun and to protect the eyes in motor vehicles and buildings. In such an application, both electrically conductive electrode layers are made transparent and no mirror layer is provided.

A decisive factor in the performance of an EC cell is the spacing of the two plates, which is in the range from about 0.1 to 0.2 mm. This small spacing also causes problems in the joining of the electrically conductive electrode layers on the insides of the plates.

It is known that the spacing between the glass plates can be set by mixing glass spheres having the appropriate diameter as spacers into the adhesive for the peripheral sealing bead of adhesive. This adhesive has to be specially produced and is thus made much more expensive. In addition, glass spheres having different diameters for different spacings have to be made available as spacers, which likewise contributes to a great increase in cost. Furthermore, it has to be ensured during the production of the cell that it is only the glass spheres which determine the spacing, i.e. that there is no adhesive between the surface of the glass sphere and the plate, and also that no leakage paths are formed between adjacent glass spheres.

A further problem in such a typical cell is making the contact between the external connections and the associated planar electrode while maintaining insulation from the other electrode, since the planar electrodes are superposed with coincident edges and separated by only a very narrow gap of from about 0.1 to 0.2 mm.

U.S. Pat. No. 5,151,824 has disclosed solving the problem by front and back glass being offset to one another by a predetermined amount, so that each glass then has a free zone of planar electrode which can be utilized for making the contacts. To each of these marginal zones there is fitted an elongated contact clip with spring finger contacts embracing the glass with the free marginal zones of the planar electrodes, and the connecting wire is in each case soldered to this contact clip.

The edge offset in this known EC cell increases its dimensions, which is not desirable, particularly not when the application is as EC mirror for motor vehicles. The automobile industry wants EC mirrors whose dimensions are virtually no different from the conventional mirrors. In addition, the spring or clip contacts are very expensive and inconvenient to fit and there is a need for soldering procedures which complicate the production process and result in not inconsiderable production costs. Moreover, the contact to the planar electrode is established only in a comparatively narrow region. This has an adverse effect on the speed with which the absorbance of the EC medium changes.

EP 0 434 453 B1 (=U.S. Pat. No. 5,066,112) has disclosed an EC mirror which has no offset of the plates of the optically effective cells and no spring contacts in the form of clips; rather, an additional conductive contact layer is applied to the planar electrode in the marginal zones of the plates including their end face and the connecting wire is then soldered onto this contact layer on the end face. Such an EC mirror is firstly very expensive to produce and, secondly, the end-face contact zone for attaching the connecting wire is very narrow so that it can easily tear off and, furthermore, there is only a small contact area which likewise has an adverse effect on the speed with which the absorbance of the EC medium changes. In addition, complicated and expensive soldering procedures are necessary.

SUMMARY OF THE INVENTION

It is an object of the invention, starting from the EC cell described at the outset, to design this such that the spacing between the two cell plates can be predetermined in a simple manner a solder-free connection of the electrode layers to external connections is possible.

This object is achieved according to the invention by a laminate of metal/solid nonconductor/metal layers being located around the periphery in the space between the two margins.

This laminate which can be produced at a constant thickness thus serves, in a simple way, as spacer which ensures a uniform, predetermined cell spacing. The metal layers of the laminate additionally allow the contacts to be made to the electrode layers of the cells and offer the possibility of a solder-free connection technique. The laminate according to the invention is therefore a multifunctional laminate.

The laminate according to the invention therefore makes it possible to dispense with mixing glass spheres into the adhesive, which enables a commercial adhesive to be used in place of an expensive special adhesive containing expensive-to-produce glass spheres. The laminate also offers the simple possibility of varying the spacing of the plates of the cells over a wide range by simple variation of the thickness of the metal layers which are preferably produced from metal foils or of the thickness of the solid nonconductor.

Since the peripheral laminate with the peripheral metal layers prescribes the maximum possible contact length to the electrode layers and thus for application of a potential, a very fast change in the absorbance of the EC medium is achieved.

According to an embodiment of the invention, a predetermined part of the laminate projects as a contact strip beyond the edge of the plates of the cells.

In such an embodiment, the two outer metal layers of the contact strip can be connected simply and without solder to an external connection, e.g. in an external EC mirror of a passenger car which has a heating foil connected via a plug to the electrical system of the car, by adhesive bonding to the heating foil after bending the contact strip over the edge of the cell.

The laminate according to the invention thus eliminates the soldering procedure, which considerably simplifies the production process and reduces the production costs. In addition, no additional parts such as contact clips and wires are required.

According to a further embodiment of the invention, the solid nonconductor of the middle layer is formed by a plastic. Appropriate selection of the plastic enables the laminate to be made flexible but still not deformable in respect of its thickness.

If the cell contains a liquid EC medium which is only introduced into the cell after assembly, the laminate and the bead of adhesive have, according to a further embodiment of the invention, a closable opening at at least one point for filling the cell with the electrochromic medium.

BRIEF DESCRIPTION OF THE DRAWINGS

Further features and advantages of the invention may be seen from the description of an illustrative embodiment in the form of an external mirror of a passenger car shown in the drawings.

In the figures.

DETAILED DESCRIPTION OF THE INVENTION

Figure 1:
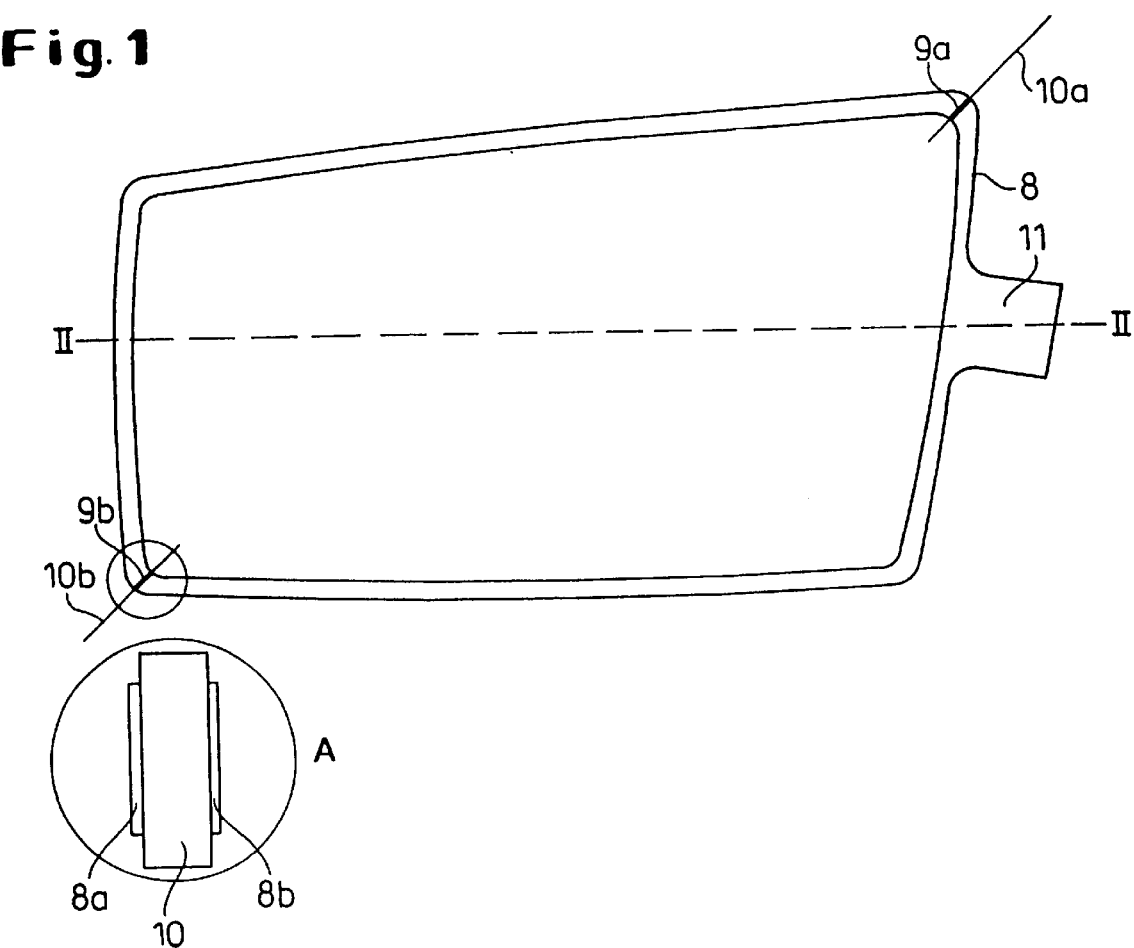
FIG. 1 shows a plan view of a laminate for the EC cell constructed according to the invention having a strip-like shape matched to the contour of the mirror.
Figure 2:
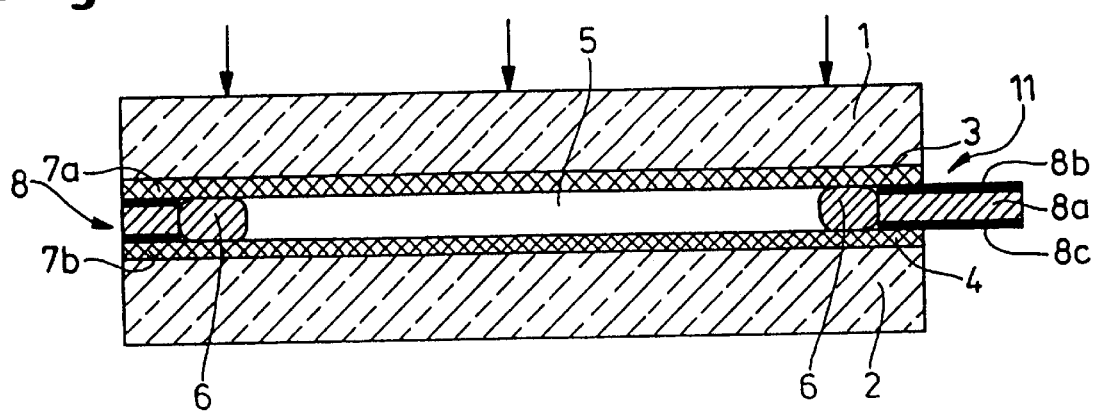
FIG. 2 shows a cross-sectional view of a finished, assembled EC cell according to the invention provided with the laminate shown in FIG. 1; the section runs through the laminate along the line 11—11 in FIG. 1.

The EC cell comprises two transparent flat plates which have a shape corresponding to the mirror configuration—here an external mirror of a passenger car—and, in the illustrative embodiment, are made of glass, preferably float glass, namely the front glass 1 which faces the direction from which the light impinges on the mirror and the back glass 2. The thickness of the plates is typically in the range from 1 to 2 mm.

In place of flat (planar) plates, it is also possible to use spherically or aspherically curved plates.

It is, in principle, also possible for the plates to be made of a transparent plastic.

The front glass 1 is provided on the side opposite that on which the light impinges with an electrically conductive planar electrode 3 which extends over the entire area of the front glass 1. Likewise, the back glass 2 is provided on the side facing the light with an electrically conductive planar electrode 4 which likewise extends over the entire area of the back glass 2. The thickness of the electrode layers is typically in the region of 1000 Ångström ($1/10$ $\mu$m). In the present example, the electrically conductive planar electrode 3 is formed by an ITO layer (indium-tin oxide) which is transparent, while the planar electrode 4 is formed by a chromium/rhodium layer which provides a specular surface.

An alternative possible design is for the planar electrode 4 to be likewise formed by an ITO layer, in which case an additional mirror layer would then have to be applied to the reverse side of the back glass 2.

The electrochromic medium 5, preferably in the form of an electrochromic solution of the type described at the outset, is located between the two plates 1 and 2 with their associated planar electrodes 3 and 4, respectively. For this purpose, the sides of the two plates 1, 2 on which the planar electrodes 3, 4 are located are adhesively bonded to one another around the edge so as to form a closed cell into which the liquid can be introduced. The bonding adhesive employed, which has to be an electrically insulating adhesive so that no internal short circuit between the two planar electrodes occurs, forms a bead of adhesive 6. This bead of adhesive 6 forms an electrically conductive margin 7a on the planar electrode on the front glass 1 and an electrically conductive margin 7b on the planar electrode 4 on the back glass 2. The width of these margins is in the order of 0.8 mm.

In the space between the margins 7a and 7b there is arranged around the periphery a three-layer laminate 8 having an inner core layer 8a of a solid nonconductor, in particular a flexible plastic, and two outer metal layers 8b and 8c which are preferably formed by a foil. The laminate therefore has a strip-like configuration corresponding to that shown in FIG. 1.

The thickness of the laminate 8 is in the region of 0.2 mm and the thickness of the inner solid plastic layer 8a is about 0.1 mm. The metal foils have a thickness of about 0.05 mm. As metal foils, preference is given to using ones made of aluminium, copper, silver or gold, with the latter two being more corrosion-resistant.

As the inner core of the laminate, preference is given to using the materials polyester, polypropylene and polyethylene.

The indicated thicknesses of 0.1 mm (plastic layer) and 2×0.05 mm (metal) are useful, average values. It is possible to use metal layers having a thickness of at least 15 $\mu$m which together with a plastic layer having a maximum thickness of 170 µm give the indicated laminate thickness of about 0.2 mm (=usual cell spacing). Maximum possible thicknesses of the metal layers are up to about 90 µm each with a correspondingly thin plastic layer.

To connect the two electrode layers 3, 4 externally with appropriate electric connections in a simple way without using solder, a certain part of the laminate 8 is configured as a contact strip 11 projecting beyond the edge of the plates 1, 2 of the cell. This contact strip 11 in which the two outer metal layers 8b, 8c provide a flat surface can be connected without using solder to flat connection leads, for example by adhesive bonding or by means of contact clips, in order to provide a connection to a DC source.

If, typically, a liquid EC medium is used, this can be introduced only after assembly of the cell, i.e. after the plates with the planar electrodes and the laminate have been adhesively bonded together. For this purpose, the laminate 8 and the bead of adhesive 6 preferably have closable openings 9a, 9b at two opposite positions for filling the cell with the liquid EC medium. Capillaries 10a, 10b having a thickness in the region of 170 µm are embedded in these openings, as can be seen, in particular, from the section enlargement A of FIG. 1. The liquid is introduced through these capillaries 10a, 10b utilizing the vacuum technique or by means of filling and venting capillaries (the latter are not shown). This makes the handling of the cells considerably simpler, regardless of whether under vacuum or ambient conditions.

The adhesive bonding of the cells is carried out in one step, after which the capillaries are the only connection between the interior of the cell and the surroundings. After the cell has been filled with the EC solution, the capillaries are broken off flush with the edge of the cell and closed using the same adhesive with which the cell was adhesively bonded. The shrinkage process during adhesive bonding slightly compresses the laminate located in the intermediate space between the two plates 1, 2, so that sufficient contact pressure between the planar electrodes 3 and 4 and the associated metal layers 8b, 8c is ensured.

Apart from the filling of the interior space of the cell with the EC solution 5 by means of the capillaries 10a and 10b, it is also possible to fill the cell via differently configured openings which are then closed in a customary manner.

Preferably, the metal layers 8b and 8c of the laminate are formed by appropriate metal foils which can nowadays be produced at a very constant thickness and thus ensure a constant thickness of the laminate and thus the necessary constant spacing of the plates of the cells.

However, it is also conceivable for the metal layers to be applied in a different way, e.g. by coating a plastic with metal by the CVD process.

The overall process of producing the EC cell of the invention is made very much cheaper by a reduction in the number of process steps and also simplification of the process steps, e.g. by complete assembly in the frame. The complexity of the EC system is greatly reduced by the reduction in the number of components and manufacturing techniques employed.

What is claimed is:

1. Electrochromic cell comprising two paired, transparent plates (1,2) with a spacing between them which are each provided on the side facing the other with an electrically conductive electrode layer (3,4) which extends over the entire area of the plate and is in each case connected to an external electric connection, which are joined to one another so as to form a seal by means of a bead of adhesive (6) running round the edge region of the plates (1,2) and in each case leaving a narrow margin (7a,7b) free, and between which an electrochromic medium (5) is located, characterized in that a laminate (8) of metal/solid nonconductor/metal layers is located around the periphery in the space between the two margins (7a,7b).

2. Cell according to claim 1, characterized in that a predetermined part of the laminate (8) projects as a contact strip (11) beyond the edge of the plates (1, 2) of the cell.

3. Cell according to claim 1, characterized in that the solid nonconductor is formed by a plastic.

4. Cell according to claim 1, containing a liquid electrochromic medium (5), characterized in that the laminate (8) and the bead of adhesive (6) have a closable opening (9a, 9b) at at least one point for filling the cell with the electrochromic medium (5).

5. Cell according to claim 1, characterized in that the metal layers (8b, 8c) are formed by a metal foil.

6. Cell according to claim 1, characterized in that the plates (1, 2) are made of float glass.

* * * * *